(12) United States Patent
Yamada et al.

(10) Patent No.: US 8,422,343 B2
(45) Date of Patent: Apr. 16, 2013

(54) OPTICAL PICKUP

(75) Inventors: Souichirou Yamada, Yokohama (JP); Jun Hato, Fujisawa (JP); Katsuhiko Kimura, Kasumigaura (JP); Yoshitaka Kusano, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 153 days.

(21) Appl. No.: 13/079,872

(22) Filed: Apr. 5, 2011

(65) Prior Publication Data

US 2011/0247021 A1 Oct. 6, 2011

(30) Foreign Application Priority Data

Apr. 5, 2010 (JP) ................................ 2010-086995

(51) Int. Cl.
*G11B 7/00* (2006.01)
(52) U.S. Cl.
USPC ....................................................... 369/44.15
(58) Field of Classification Search ............... 369/44.14, 369/44.15, 44.16, 44.21, 44.22; 359/811, 359/813, 814, 819, 822, 823
See application file for complete search history.

(56) References Cited

U.S. PATENT DOCUMENTS

| | | | | |
|---|---|---|---|---|
| 2003/0016597 | A1* | 1/2003 | Haruguchi et al. | 369/44.16 |
| 2006/0077781 | A1* | 4/2006 | Yamada | 369/44.14 |
| 2006/0077782 | A1* | 4/2006 | Yamada | 369/44.15 |
| 2006/0280060 | A1 | 12/2006 | Imai et al. | |
| 2007/0171776 | A1* | 7/2007 | Uragami et al. | 369/44.15 |
| 2009/0238062 | A1* | 9/2009 | Onojima et al. | 369/112.23 |

FOREIGN PATENT DOCUMENTS

| | | |
|---|---|---|
| JP | 2000-182258 | 6/2000 |
| JP | 2006-344276 | 12/2006 |
| JP | 2007-018573 | 1/2007 |

* cited by examiner

*Primary Examiner* — Thang Tran
(74) *Attorney, Agent, or Firm* — Antonelli, Terry, Stout & Kraus, LLP.

(57) ABSTRACT

In an optical pickup for use in an optical disc device, wire rods are wound directly around a lens-coil holder to make tracking coils and focus coils. The lens-coil holder is divided into three holders, one of which holds an optical lens thereon and has on its sides wire-winding protrusions for wiring wire rods therearound to make tracking coils. The remaining holders have focus coils that are wound therearound. Alternatively, the lens-coil holder is divided into two holders, one of which has on its sides wire-winding protrusions for wiring wire rods therearound to make tracking coils. The remaining holder holds an optical lens thereon and has focus coils that are wound therearound. The lens-coil holder has a cavity for letting pass through a laser beam emitted in parallel to an optical disc surface.

4 Claims, 10 Drawing Sheets

OPTICAL PICKUP

INCORPORATION BY REFERENCE

This application relates to and claims priority from Japanese Patent Application No. 2010-086995 filed on Apr. 5, 2010, the entire disclosure of which is incorporated herein by reference.

BACKGROUND OF THE INVENTION (1) Field of the Invention

The present invention relates to optical pickups for use in optical-disc devices and more particularly to an optical pickup in which driving coils for driving an objective lens are wound around holders.

(2) Description of the Related Art

In the field of optical-disc devices, in an attempt to meet the recent demand for thinner devices, optical pickups, whose job is to record information signals on optical discs or play the signals back from the discs through the irradiation of the discs with laser beams, are also being made thinner.

In the meantime, tracking coils, focus coils and tilt coils for driving the optical lens of an optical pickup have so far been held on a holder on which the objective lens is held by affixing coils that had preliminarily been made to the holder. By contrast, there has recently been studied a method of making coils by winding wire rods around components of the holder with the aim of facilitating the production of an optical pickup and reducing cost.

Japanese Patent Application Laid-Open No.2007-18573 discloses a technique for making tracking coils, focus coils and tilt coils by winding wire rods around components of a lens holder.

SUMMARY OF THE INVENTION

As optical pickups become thinner, the recent light path of a laser beam, which beam is irradiated onto an optical disc in order to record information signals on the disc or play the signals back from the disc, is mostly set as follows: A laser beam is emitted from a laser light source in the direction parallel to an optical disc surface, led to under an objective lens, totally reflected in the substantially right-angled direction by a total-reflection mirror provided under the objective lens and irradiated onto the optical disc surface through the objective lens. In such a case, one surface of a holder on which the objective lens is held needs to have a cavity through which the laser beam passes. The technique disclosed in Japanese Patent Application Laid-Open No.2007-18573 is not necessarily suitable for attaining thinner optical pickups because a tracking coil (reference numeral 12 in FIG. 2 of the patent literature) located in the position where the cavity is to be provided hinders the setting of the light path in the laser beam in such a way as mentioned above.

In addition, the making of coils by winding wire rods around components of an objective-lens holder gives rise to further problems as follows: For one thing, tracking coils and focus coils need to be placed in such a way that they do not overlap each other in the perpendicular direction because the former drive an objective lens in the radial direction of an optical disc surface (tracking direction), while the latter drive the lens in the vertical direction of the optical disc surface (focus direction). Needless to say, each one of the coils must be placed in a position close to the objective lens so that it can get enough thrust in each direction to be given to the lens. In addition, coils need to be placed in such a way that coils that have been wound earlier do not to hinder the making of coils to be wound later. Furthermore, it is necessary to consider that, in winding a specific coil to assemble an optical pickup, components for winding other coils therearound do not hinder the work.

In view of forgoing problems, it is an object of the present invention to provide an optical pickup in which driving coils for driving an objective lens are wound around holders.

To address forgoing problems, the invention provides an optical pickup of an optical-disc apparatus for recording information signals on an optical disc or playing the signals back from the disc through the irradiation of the disc with a laser beam, the optical pickup comprising: a laser-light source that emits the laser beam in the linear-velocity direction paralleling the disc surface of the optical disc, a total-reflection mirror that receive the laser beam emitted at the laser-light source to reflect the beam in the direction vertical to the disc surface of the optical disc, and an objective-lens-driving apparatus that has an objective lens for receiving the laser beam reflected by the total-reflection mirrors to irradiate the optical disc with the beam, the objective-lens-driving apparatus comprising: an objective lens for focusing the laser beam on the optical disc, a plurality of tracking coils that supply fluctuating magnetic fields for controlling the position of the objective lens in the radial direction with regard to the optical disc surface, two focus coils that supply fluctuating magnetic fields for controlling the position of the objective lens in the vertical direction with regard to the optical disc surface, a lens-coil holder that holds the objective lens on the surface facing the optical disc and holds the tracking coils and the focus coils thereon, and a group of magnets that generate DC magnetic fields for driving the lens-coil holder in the radial direction and in the vertical direction with regard to the optical disc surface, the lens-coil holder comprising: a first holder that holds thereon the objective lens and the tracking coils having their axes in the perpendicular direction with regard to the optical axis direction of the objective lens, a second holder around that one of the two focus coils is wound, and a third holder around that the remaining one of the two focus coils is wound, the first holder comprising: a cavity for irradiating the total-reflection mirrors with the laser beam therethrough that stretches in the radial direction of the optical disc on the sides paralleling the radial direction of the optical disc, a wire-winding protrusion that is disposed on the side paralleling the radial direction of the optical disc in the portion excluding the cavity and around that the tracking coil is wound in parallel with the side, and two inserting holes into that the second holder and the third holder are inserted in such a way that the central axes of the focus coils are located in the perpendicular direction with regard to the central axes of the tracking coils.

In addition, the present invention provides an optical pickup of an optical-disc device recording information signals on an optical disc or playing the signals back from the disc through the irradiation of the disc with a laser beam, the optical pickup comprising: a laser-light source that emits the laser beam in the linear-velocity direction paralleling the disc surface of the optical disc, a total-reflection mirror that receives the laser beam emitted at the laser-light source to reflect the beam in the direction vertical to the disc surface of the optical disc, and an objective-lens-driving apparatus that has an objective lens for receiving the laser beam reflected by the total-reflection mirrors to irradiate the optical disc with the beam, and the objective-lens-driving apparatus comprising: an objective lens for focusing the laser beam on the optical disc, a plurality of tracking coils that supply fluctuating magnetic fields for controlling the position of the objective lenses in the radial direction with regard to the optical disc surface, two focus coils that supply fluctuating magnetic fields for controlling the position of the objective lenses in the vertical direction with regard to the optical disc surface, a lens-coil holder that holds the objective lens on the surface facing the optical disc and holds the tracking coils and the focus coils thereon, and a lens-coil holder that holds the objective lens on the surface facing the optical disc and holds the tracking coils and the focus coils thereon, and a group of magnets that generate DC magnetic fields for driving the lens-coil holder in the radial direction and in the vertical direction with regard to the optical disc surface, the lens-coil holder comprising: a fourth holder that holds the tracking coils thereon, and a fifth holder that holds the objective lenses thereon and around that are wound by the focus coils having their axes in the paralleling direction with regard to the optical axes of the objective lenses, the fourth holder comprising: a cavity for irradiating the total-reflection mirrors with the laser beams therethrough that stretches in the radial direction of the optical disc on the sides paralleling the radial direction of the optical disc, a wire-winding protrusion that is disposed on the side paralleling the radial direction of the optical disc in the portion excluding the cavity and around that the tracking coil is wound in parallel with the side, and two inserting holes into that the fifth holder is inserted in such a way that the central axes of the focus coils are located in the perpendicular direction with regard to the central axes of the tracking coils.

The present invention has the advantageous effect that it can provide an optical pickup whose holders are wound around by driving coils for driving an objective lens, thereby contributing to easier production of optical pickups.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENT

Hereinafter, we will describe about embodiments of the present invention with reference to accompanying drawings.

Figure 1:
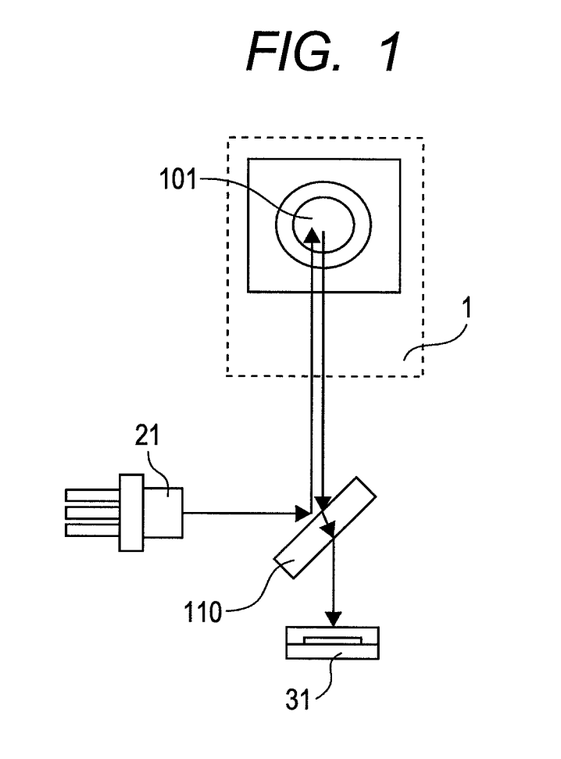
FIG. 1 is a block diagram of an optical pickup in one embodiment of the present invention.

First, let us explain about the whole constitution of an optical pickup for use in an optical-disc device with reference to FIG. 1.

FIG. 1 is a block diagram of an optical pickup in one embodiment of the present invention.

In FIG. 1, the optical pickup has an objective-lens-driving apparatus 1, a laser light source 21 and a photo detector 31 as the most basic components. While the objective-lens-driving apparatus 1, as will be described later, contains many components, just an objective lens 101 is shown here. The arrows in the drawing illustrate the light path of a laser beam emitted at the laser light source 21.

The laser beam emitted at the laser light source 21 is led to the objective lens 101 after having been totally reflected on the total-reflection mirror 110 (As is illustrated in the drawing, the mirror may be a beam splitter performing both total reflection and permeation). The laser beam is further irradiated onto the surface of a not shown optical disc to have information the beam carries recorded on the disc. The laser beam, which is reflected on the optical disc surface and converged by the objective lens 101, is led to the photo detector 31 to have information recorded on the disc played back in the not shown signal processing circuits of the later steps.

Note that, although an optical pickup in real life has many other components including a collimate lens for converting a diffused light emitted from the laser light source 21 into a parallel light, reference to them is omitted for the sake of simplifying the description.

Hereinafter, embodiments of the present invention will be described with emphasis on the objective-lens-driving apparatus 1 among components of the optical pickup illustrated in FIG. 1 and with reference to accompanying drawings.

EXAMPLE 1

Figure 2:
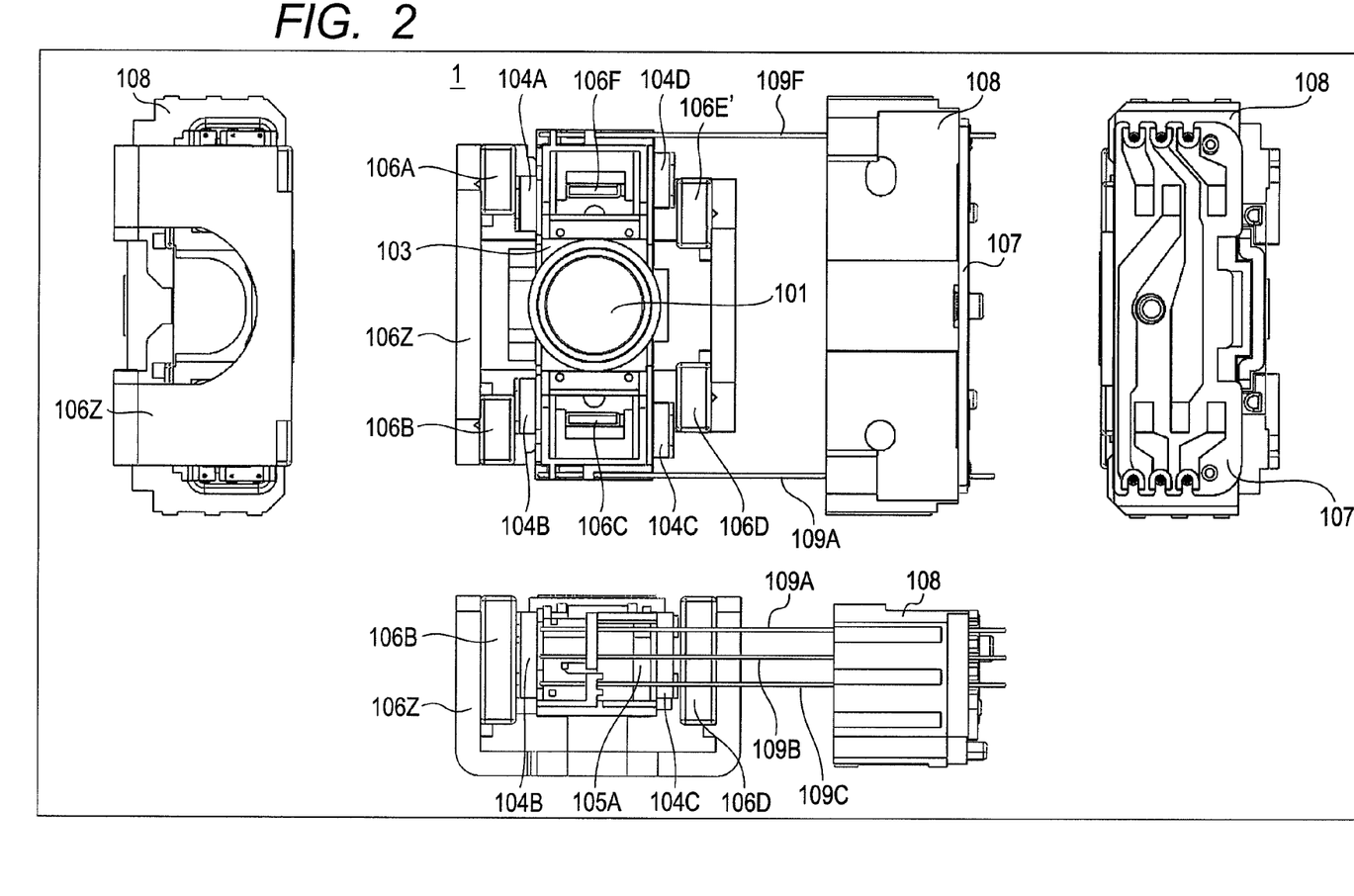
FIG. 2 contains a top view and side views of an objective-lens-driving apparatus in Example 1.

FIG. 2 contains a top view and side views of an objective-lens-driving apparatus 1 in Example 1, in which a top view lies in the center. In the drawing, the up-and-down direction is the tracking direction, or the radial direction of the optical disc, the right-and-left direction is the tangential direction, or the linear-velocity direction, and the vertical direction is the focusing direction. Together with the top view, the drawing shows side views as viewed from the left direction, right direction and lower direction with regard to the top view.

The objective lens 101 is held on a lens-coil holder 103. The holder 103 has the function of an actuator for moving the objective lens 101 held thereon in the tracking direction or in the focusing direction and hence controls the tracking or the focusing of the lens onto the recording track of an optical disc.

As is well known, these movements are controlled by means of magnetic fields. Tracking control signals and focusing control signals supplied from a conductive substrate 107 are fed to the lens-coil holder 103 through suspension wires 109A to 109F. (Reference numerals 109D and 109E, which are not here, will be shown in a subsequent drawing). The tracking control signals are, then, fed to tracking coils 104A to 104D held on the lens-coil holder 103. The tracking coils 104A to 104D generate fluctuating magnetic fields according to the tracking control signals, and the lens-coil holder 103 holding the objective lens 101 thereon, in response to the magnetic fields, controls the lens 101 in such a way that a laser beam passing through the lens 101 will trace the center of a recording track in an optical disc. The focusing control signals, on the other hand, are fed to focus coils 105. The focus coils 105 generate fluctuating magnetic fields according to the focusing control signals, and the lens-coil holder 103 holding the objective lens 101 thereon, in response to the magnetic fields, controls the lens 101 in such a way that a laser beam passing through the lens 101 will be focused on the recording surface of an optical disc.

The lens-coil holder 103 holds the objective lens 101, the tracking coils 104A to 104D and the focus coils 105 thereon. The suspension wires 109A to 109F have the function of elastically holding the lens-coil holder 103 on a dumping holder 108 by means of the conductive substrate 107 as well as the function of transmitting aforementioned control signals.

Note that, although here is shown an example having six magnets, four tracking coils, two focus coils and six suspension wires, this is just an example and hence such cases as having different number of them will also fall under the category of the present example.

Let us explain about the light path of a laser beam leading to the objective lens 101.

Figure 3:
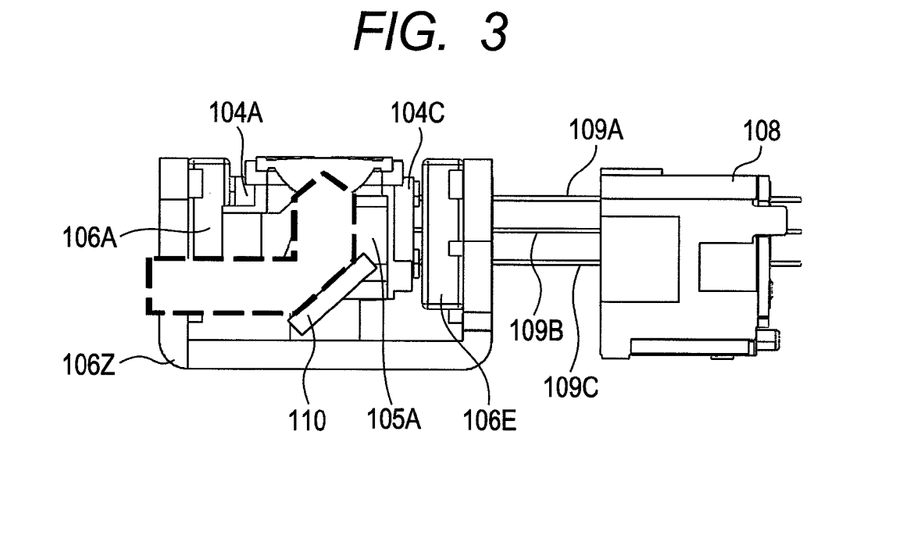
FIG. 3 is a sectional view of an objective-lens-driving apparatus in Example 1.

FIG. 3 is a sectional view of an objective-lens-driving apparatus 1 in Example 1, showing the view in the case where the apparatus 1 in FIG. 1 was cut off in the right-and-left direction in the center of the objective lens 101.

In FIG. 3, the part enclosed with a dashed line illustrates the light path of a laser beam. A laser beam emitted at a laser light source (not shown) is made incident in a total-reflection mirror 110 from the left side of the drawing and then totally reflected in the upper direction of the drawing toward an objective lens 101. As mentioned before, the constitution illustrated in FIG. 3 is effective in making an optical pickup thinner. In this case, a large cavity for letting a laser beam pass through is necessary in the depth direction of FIG. 3.

Let us explain more in detail about Example 1 including the actual size of the cavity with reference to FIG. 4 to 8.

Figure 4:
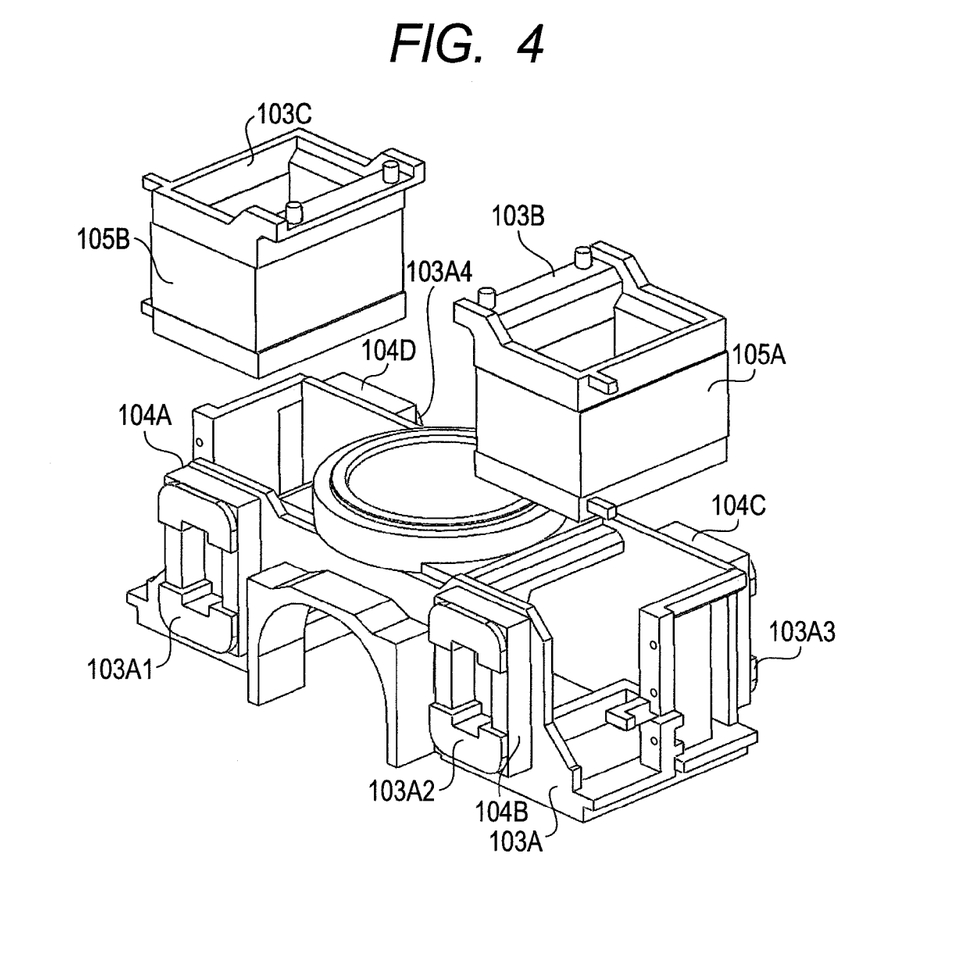
FIG. 4 is an external view of an objective-lens-driving apparatus in Example 1.
Figure 5:
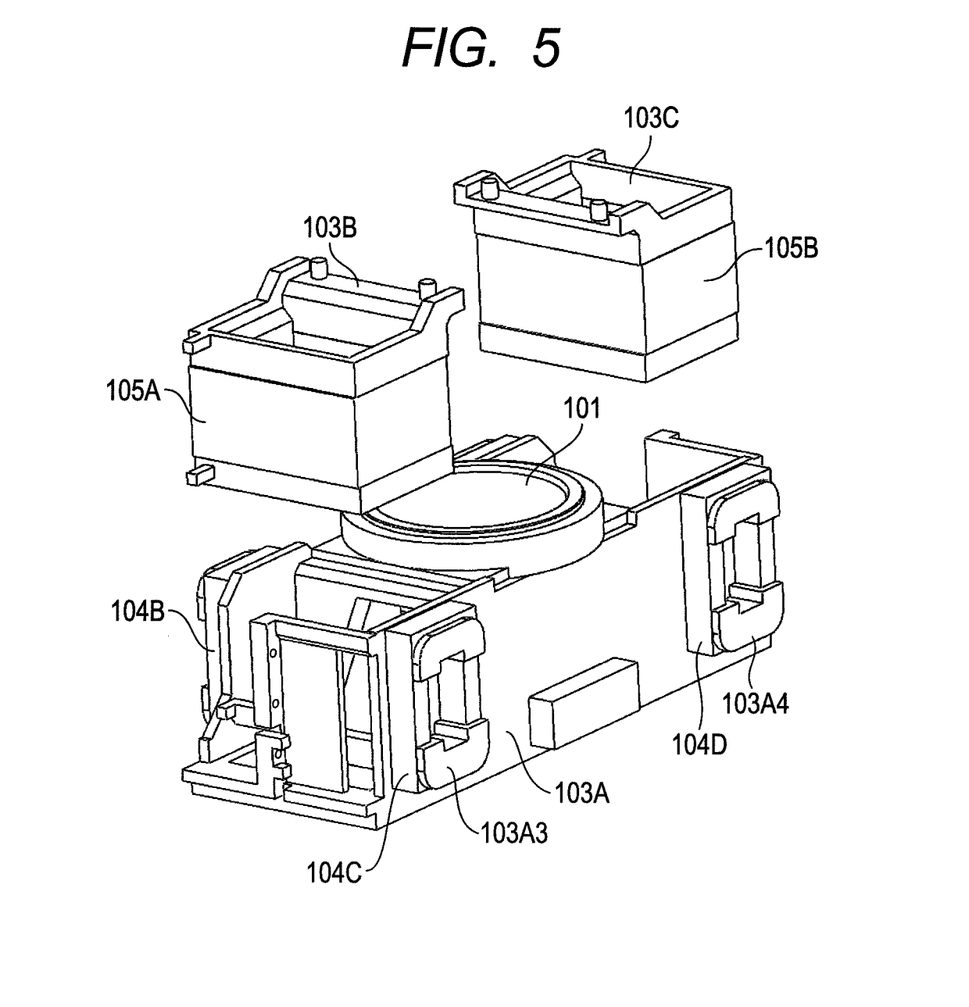
FIG. 5 is another external view of an objective-lens-driving apparatus in Example 1.
Figure 6:
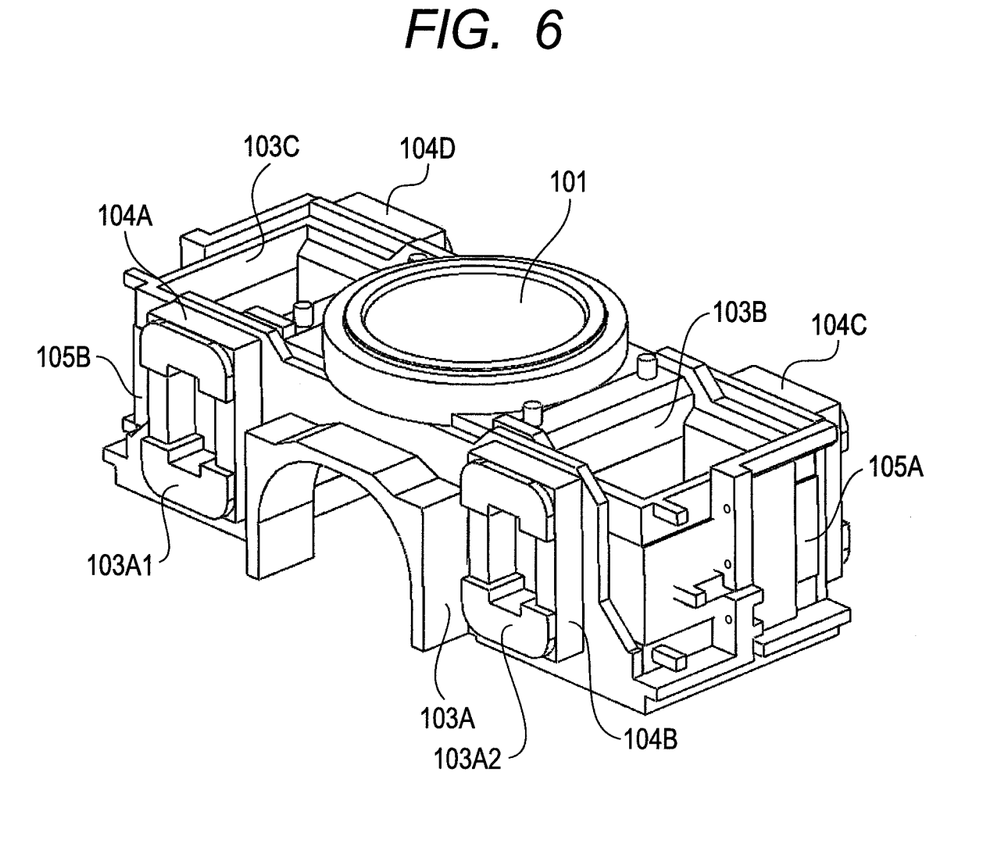
FIG. 6 is still another external view of an objective-lens-driving apparatus in Example 1.

FIG. 4 is an external view of the objective-lens-driving apparatus 1 in Example 1 as drawn from the obliquely lower left with regard to the top view in the center of FIG. 2, showing a step before the lens-coil holder 103 is integrally assembled. FIG. 5 is another external view of the objective-lens-driving apparatus 1 in Example 1 as drawn from the obliquely lower right with regard to the top view in the center of FIG. 2, showing also a step before the lens-coil holder 103 is integrally assembled. FIG. 6 is still another external view of the objective-lens-driving apparatus 1 in Example 1 as drawn from the obliquely lower left with regard to the top view in the center of FIG. 2, showing a step in which the lens-coil holder 103 has integrally been assembled. The lens-coil holder 103 includes a lens-coil holder 103A holding the objective lens 101 and the tracking coils 104A to 104D thereon, a first coil holder 103B holding the focus coil 105A thereon, and further a second coil holder 103C holding a focus coil 105B thereon. In another words, the lens-coil holder 103 is composed of three holders 103A to 103C.

In the lens-coil holder 103A according to FIG. 4, there is provided a large cavity for letting a laser beam pass through in the center on the left front of the drawing. Tracking coils cannot be disposed where this cavity is. The tracking coils 104A and 104B, therefore, are disposed on both sides of the cavity. This arrangement makes it possible to meet the foregoing demand for thinner optical pickups.

The tracking coils 104A to 104D are made not by affixing coils that have preliminary been wound to the lens-coil holder 103A, but by winding wires by making use of wire-winding protrusions 103A1 to 103A4 the lens-coil holder 103A has. As for the focus coils 105A and 105B, they are made not by affixing coils that have preliminary been wound to the first coil holder 103B and the second coil holder 103C, but by winding wires around the first coil holder 103B and the second coil holder 103C. The first coil holder 103B, around which the focus coil 105A has been wound, and the second coil holder 103C, around which the focus coil 105B has been wound, are put in the position illustrated in FIG. 4 or FIG. 5 before they are moved downward in the drawings and inserted into the lens to coil holder 103A as is illustrated in FIG. 6. so as to be fixed.

To form the lens-coil holder 103 by combining three holders as described above, allows the tracking coils 104A to 104D and the focus coils 105A and 105B to be placed in the positions close to the objective lens 101 in such a way that they do not overlap each other in the perpendicular direction. In addition, any of the coils that have been wound earlier do not hinder the making of coils to be wound later. Components for winding coils therearound like the wire-winding protrusions 103A1 to 103A4, for example, do not hinder the winding of other coils, and further, the assembling of an optical pickup.

The wire-winding protrusions 103A1 to 103A4 are installed only in the lens-coil holder 103A. There is also a method of installing a part of components of the wire-winding protrusions 103A1 to 103A4, for example, in the coil holders 103B and 103C. In this case, the first coil holder 103B, around which the focus coil 105A has been wound, and the second coil holder 103C, around which the focus coil 105B has been wound, will be inserted into the lens-coil holder 103A to be fixed before the tracking coils 104A to 104D are wound around the wire-winding protrusions 103A1 to 103A4. This method, however, can give rise to such a problem that chinks between the lens-coil holder 103A, the first coil holder 103B and the second coil holder 103C are liable to get them rickety, thereby causing the characteristics of the tracking coils 104A to 104D to deviate from designed value. It is, therefore, desirable to have the wire-winding protrusions 103A1 to 103A4 only in the lens-coil holder 103A as has been illustrated in FIGS. 4 and 5.

In FIGS. 4 and 5, the central axes of the focus coils 105A and 105B parallel the vertical direction in the drawings or the optical-axis direction of the objective lens 101. The central axes of the tracking coils 104A to 104D lie in the perpendicular direction with regard to them. This arrangement makes it possible to control the position of the objective lens 101 in the vertical direction and in the radial direction with regard to an optical disc surface using both coils.

By the way, optical pickups mostly have tilt coils for adjusting the inclination of the objective lens 101 to an optical disc. As for the tilt coils, you have only to wind them around over the focus coils 105A and 105B, for example, and hence the present embodiment does not limit the way of their placement.

Figure 7:
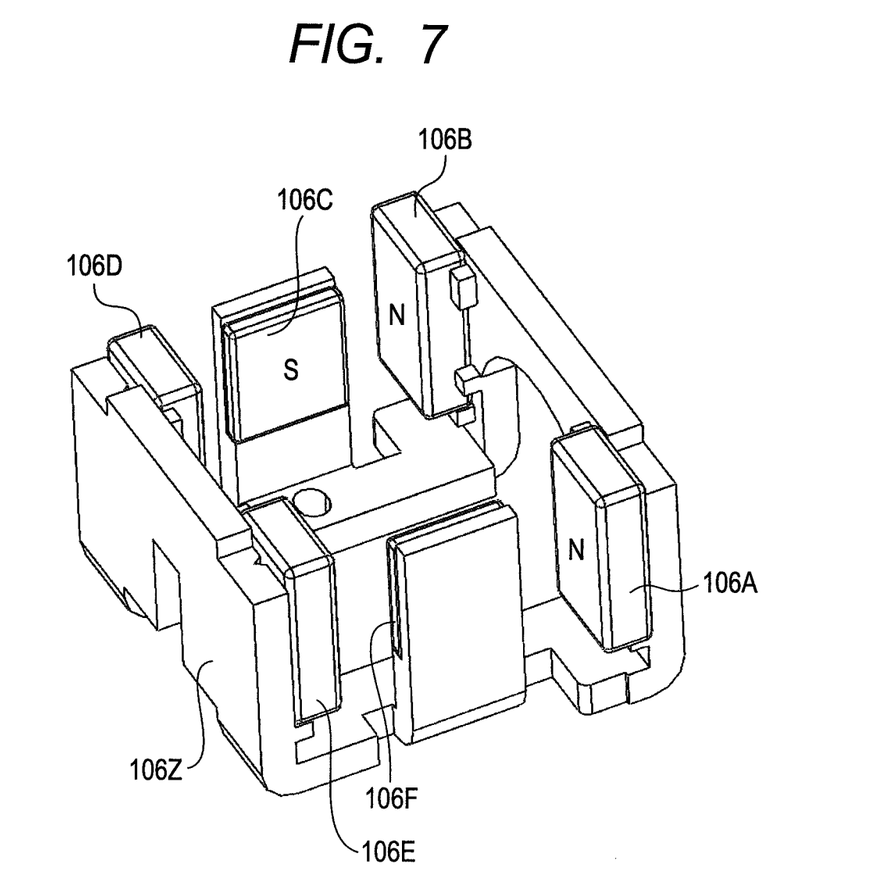
FIG. 7 is an external view of a magnet holder in Example 1.
Figure 8:
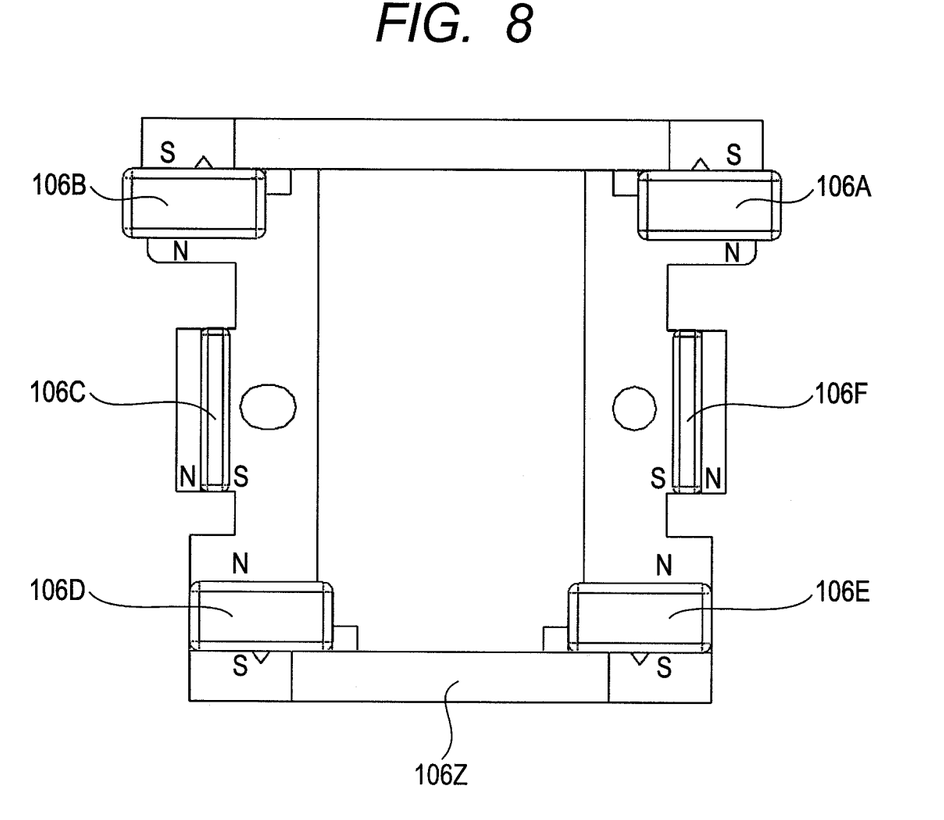
FIG. 8 is another external view of a magnet holder in Example 1.

FIG. 7 is an external view of the magnet holder 106z in Example 1 as drawn from the obliquely upper right. FIG. 8 is another external view of the magnet holder 106z in Example 1 depicting from right above FIG. 2 the state in which it is rotated 90 degrees clockwise. The magnet holder 106z holds thereon magnets 106A to 106F for giving the lens-coil holder 103 DC magnetic fields. In FIG. 7, a face on the opposite right side of the magnet holder 106z is provided with a large cavity for letting a laser beam pass through. It is impossible to dispose magnets at least where the cavity is.

As was previously illustrated in FIG. 3, a total-reflection mirror 110 is disposed between the opposing magnets 106C and 106F. For this reason, the magnets 106A to 106F are disposed in such a way that they keep away from where the cavity is and at the same time they surround the total-reflection mirror 110.

Hereinafter, we are going to further explain the features of the Example 1 through a comparison with a conventional embodiment.

Figure 9:
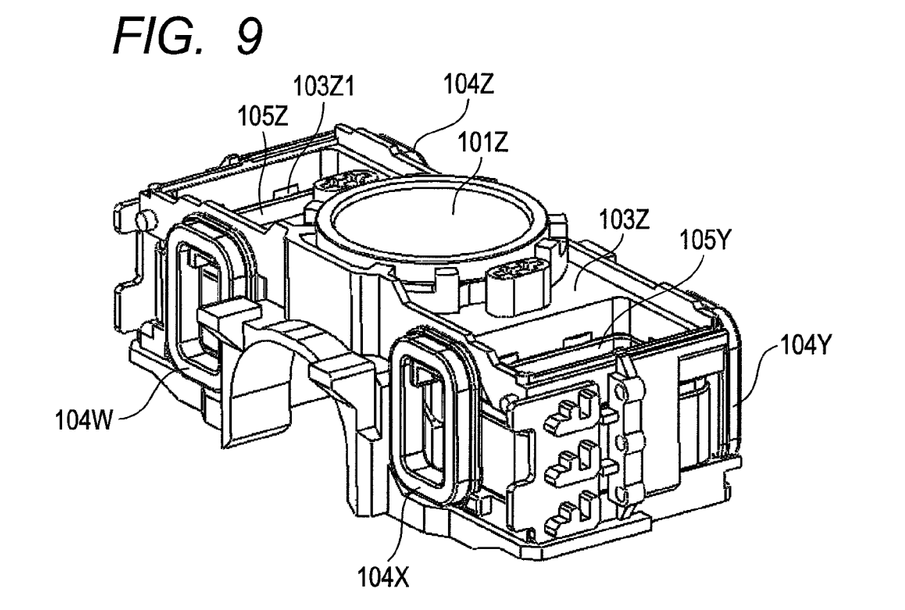
FIG. 9 is an external view of an objective-lens-driving apparatus in a conventional embodiment.

FIG. 9 is an external view of an objective-lens-driving apparatus in a conventional embodiment as drawn from the same direction as previous FIG. 4. A coil-lens holder 103z holds an objective lens 101z, tracking coils 104W to 104z and focus coils 105Y and 105z. Here, the tracking coils 104W to 104z and focus coils 105Y and 105z are ones that have preliminarily been made and after that have been affixed to the interior and the sides of the coil-lens holder 103z.

First, the focus coils 105Y and 105z are affixed to the interior of the coil-lens holder 103z at the predetermined positions to be fixed. At this time, the coils 105Y and 105z are inserted along small projections 103z1(Just one numeral is given for the sake of simplifying the drawing) provided in the interior of the coil-lens holder 103z for the purpose of positioning their heights. That is to say, the coils 105Y and 105Z are inserted from the obliquely lower left in FIG. 9. For this reason, at least the tracking coils 104W and 104X are affixed to the coil-lens holder 103z at the predetermined positions to be fixed after the focus coils 105Y and 105z have been fitted.

According to the embodiment in FIG. 9, even when you are going to make the tracking coils 104W to 104z, not to mention the focus coils 105Y and 105z, it is impossible to use such a method of winding wires directly on coil holders as the present embodiment does. As mentioned above, the focus coils 105Y and 105Z are inserted from the obliquely lower left in FIG. 9. It is, therefore, impossible to install the wire-winding protrusions 103A1 to 103A4 in FIGS. 4 and 5 on the fitting surfaces of at least the tracking coils 104W and 104X in the coil-lens holder 103z, and hence it is impossible to wind at least the tracking coils 104W and 104X directly around coil holders.

By contrast, the present embodiment makes it possible to make focus coils and tracking coils by winding them around coil holders, and hence it has an advantageous effect of facilitating the production of optical pickups.

EXAMPLE 2

Figure 10:
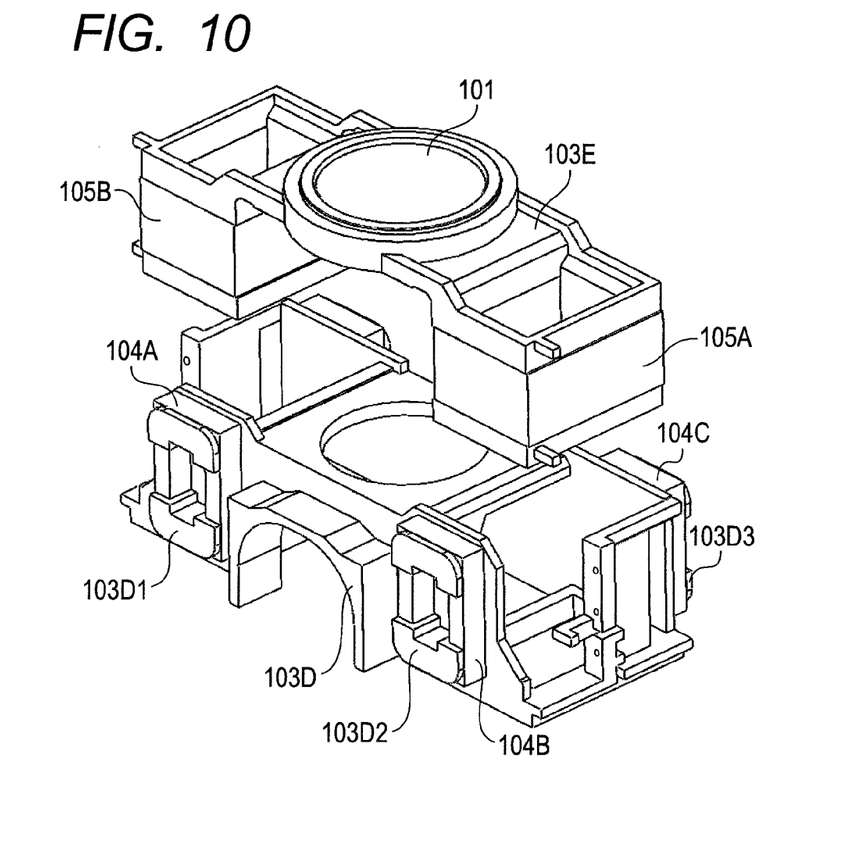
FIG. 10 is an external view of an objective-lens-driving apparatus in Example 2.
Figure 11:
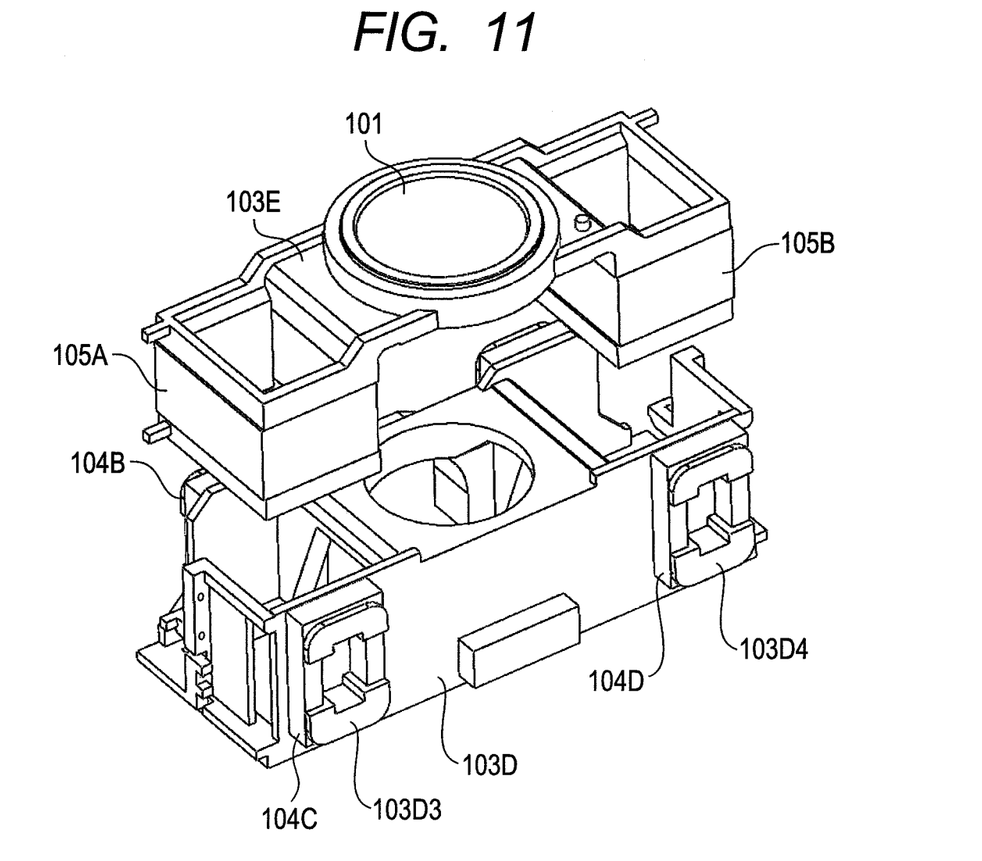
FIG. 11 is another external view of an objective-lens-driving apparatus in Example 2.
Figure 12:
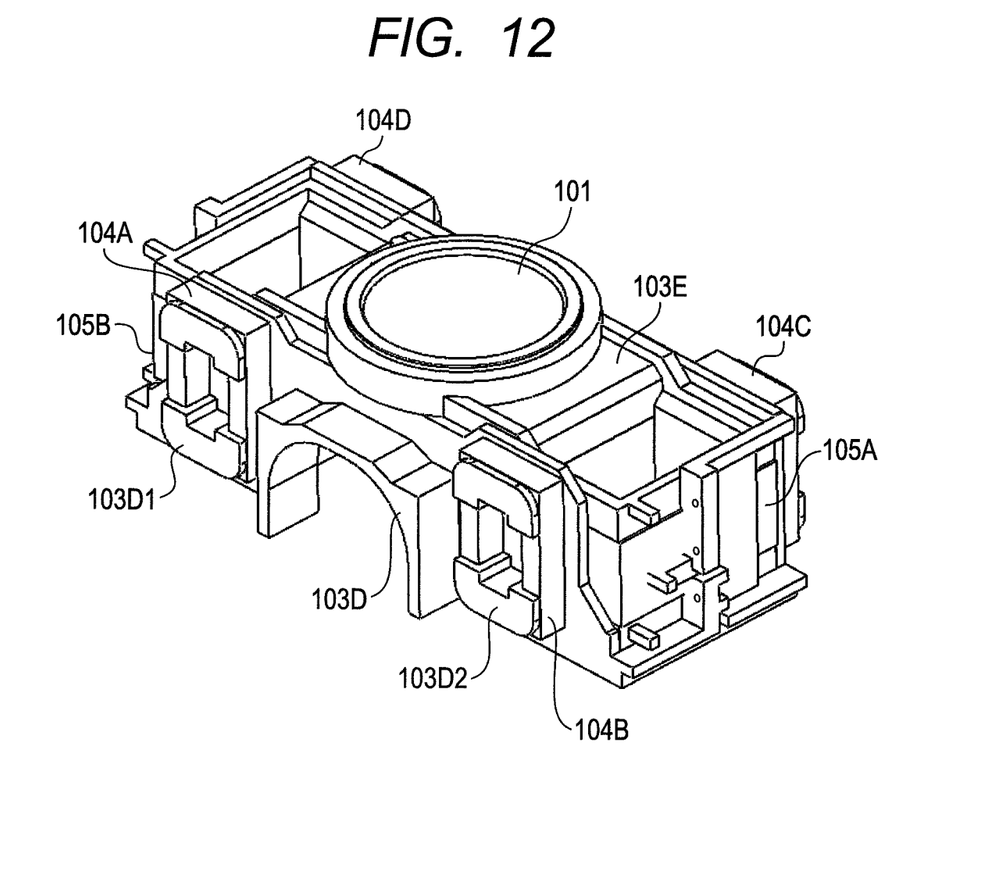
FIG. 12 is still another external view of an objective-lens-driving apparatus in Example 2.

FIG. 10 is an external view of an objective-lens-driving apparatus in Example 2 as drawn from the obliquely lower left with regard to the top view in the center of FIG. 2, showing a step before a lens-coil holder 103 is integrally assembled. FIG. 11 is another external view of the objective-lens-driving apparatus in Example 2 as drawn from the obliquely lower right with regard to the top view in the center of FIG. 2, showing also a step before the lens-coil holder 103 is integrally assembled. FIG. 12 is still another external view of the objective-lens-driving apparatus in Example 2 as drawn from the obliquely lower left with regard to the top view in the center of FIG. 2, showing a step in which the lens-coil holder 103 has integrally been assembled. The lens-coil holder 103 includes a coil holder 103D holding tracking coils 104A to 104D thereon and a lens-coil holder 103E holding an objective lens 101 and focus coils 105A and 105B thereon. In other words, the lens-coil holder 103 is composed of two holders.

In the coil holder 103D according to FIG. 10, there is provided a large cavity for letting a laser beam pass through on the left front of the drawing. Tracking coils cannot be disposed where this cavity is. The tracking coils 104A and 104B, therefore, are disposed on both sides of the cavity. This arrangement makes it possible to meet the foregoing demand for thinner optical pickups The tracking coils 104A to 104D are made not by affixing coils that have preliminary been wound to the coil holder 103D, but by winding wires around wire-winding protrusions 103D1 to 103D4 the holder 103D has. As for the focus coils 105A and 105B, they are made not by affixing coils that have preliminary been wound to the lens-coil holder 103E, but by winding wires around the holder 103E. The lens-coil holder 103E, around which the focus coils 105A and 105B have been wound, is put in the position illustrated in FIG. 10 or FIG. 11 before it is moved downward in the drawings and inserted into the coil holder 103D to be fixed as is illustrated in FIG. 12.

To form the lens-coil holder 103 by combining two holders as described above, allows the tracking coils 104A to 104D and the focus coils 105A and 105B to be placed in the positions close to the objective lens 101 in such a way that they do not overlap each other in the perpendicular direction. In addition, any of the coils that have been wound earlier do not hinder the making of coils to be wound later. Components for winding coils therearound like the wire-winding protrusions 103D1 to 103D4, for example, do not hinder the winding of other coils, and further, the assembling of an optical pickup.

The wire-winding protrusions 103D1 to 103D4 are installed only in the coil holder 103D. There is also a method of installing a part of components of the wire-winding protrusions 103D1 to 103D4, for example, in the lens-coil holder 103E. In this case, the lens-coil holder 103E, around which the focus coils 105A and 105B have been wound, will be inserted into the coil holder 103D to be fixed, before the tracking coils 104A to 104D are wound around the wire-winding protrusions 103D1 to 103D4. This method, however, can give rise to such a problem that chinks between the coil holder 103D and the lens-coil holder 103E are liable to get them rickety, thereby causing the characteristics of the tracking coils 104A to 104D to deviate from designed value. It is, therefore, desirable to have the wire-winding protrusions 103D1 to 103D4 only in the coil holder 103D as has been illustrated in FIGS. 10 and 11.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An optical pickup of an optical-disc device recording information signals on an optical disc or playing the signals back from the disc through the irradiation of the disc with a laser beam, the optical pickup comprising:
   a laser-light source that emits the laser beam in a linear-velocity direction paralleling the disc surface of the optical disc,
   a total-reflection mirror that receive the laser beam emitted at the laser-light source to reflect the beam in a direction vertical to the disc surface of the optical disc, and
   an objective-lens-driving apparatus that has an objective lens for receiving the laser beam reflected by the total-reflection mirror to irradiate the optical disc with the beam,
   the objective-lens-driving apparatus comprising:
   the objective lens for focusing the laser beam on the optical disc,
   a plurality of tracking coils that supply fluctuating magnetic fields for controlling the position of the objective lens in a radial direction with regard to the optical disc surface, two focus coils that supply fluctuating magnetic fields for controlling the position of the objective lens in the vertical direction with regard to the optical disc surface, a lens-coil holder that holds the objective lens on the surface facing the optical disc and holds the tracking coils and the focus coils thereon, and a group of magnets that generate DC magnetic fields for driving the lens-coil holder in the radial direction and in the vertical direction with regard to the optical disc surface, the lens-coil holder comprising:

a first holder that holds thereon the objective lens and the tracking coils having their axes in a perpendicular direction with regard to the optical axis direction of the objective lens, a second holder around that one of the two focus coils is wound, and a third holder around that the remaining one of the two focus coils is wound, the first holder comprising:

a cavity for irradiating the total-reflection mirror with the laser beam therethrough that stretches in the radial direction of the optical disc on the sides paralleling the radial direction of the optical disc, a wire-winding protrusion that is disposed on a side paralleling the radial direction of the optical disc in the portion excluding the cavity and around that the tracking coil is wound in parallel with the side, and two inserting holes into that the second holder and the third holder are inserted in such a way that the central axes of the focus coils are located in a perpendicular direction with regard to the central axes of the tracking coils.

2. An optical pickup of an optical-disc device recording information signals on an optical disc or playing the signals back from the disc through the irradiation of the disc with a laser beam, the optical pickup comprising:

a laser-light source that emits the laser beam in a linear-velocity direction paralleling the disc surface of the optical disc, a total-reflection mirror that receives the laser beam emitted at the laser-light source to reflect the beam in a direction vertical to the disc surface of the optical disc, and an objective-lens-driving apparatus that has an objective lens for receiving laser beam reflected by the total-reflection mirror to irradiate the optical disc with the beam, and the objective-lens-driving apparatus comprising:

the objective lens for focusing the laser beam on the optical disc, a plurality of tracking coils that supply fluctuating magnetic fields for controlling the position of the objective lenses in a radial direction with regard to the optical disc surface, two focus coils that supply fluctuating magnetic fields for controlling the position of the objective lenses in the vertical direction with regard to the optical disc surface, a lens-coil holder that holds the objective lenses on the surface facing the optical disc and holds the tracking coils and the focus coils thereon, and a group of magnets that generate DC magnetic fields for driving the lens-coil holder in the radial direction and in the vertical direction with regard to the optical disc surface, the lens-coil holder comprising:

a first holder that holds the tracking coils thereon, and a second holder that holds the objective lenses thereon and around that are wound by the focus coils having their axes in the paralleling direction with regard to the optical axes direction of the objective lenses, the first holder comprising:

a cavity for irradiating the total-reflection mirror with the laser beams therethrough that stretches in the radial direction of the optical disc on the sides paralleling the radial direction of the optical disc, a wire-winding protrusion that is disposed on a side paralleling the radial direction of the optical disc in the portion excluding the cavity and around that the tracking coil is wound in parallel with the side, and two inserting holes into that the second holder is inserted in such a way that the central axes of the focus coils are located in a perpendicular direction with regard to the central axes of the tracking coils.

3. The optical pickup according to claim 1, wherein the optical pickup has a magnet holder that holds the group of magnets thereon, the magnet holder having a cavity for irradiating the total-reflection mirror with the laser beam therethrough that stretches in the radial direction of the optical disc.

4. The optical pickup according to claim 2, wherein the optical pickup has a magnet holder that holds the group of magnets thereon, the magnet holder having a cavity for irradiating the total-reflection mirror with the laser beam therethrough that stretches in the radial direction of the optical disc.

* * * * *